US005806961A

United States Patent [19]

Dalton et al.

[11] Patent Number: 5,806,961

[45] Date of Patent: Sep. 15, 1998

[54] RECHARGEABLE FLASHLIGHT ASSEMBLY WITH NIGHTLIGHT

[75] Inventors: David R. Dalton, Westlake, Ohio; Peter F. Lynch; Scott W. Osiecki, both of Skaneateles, N.Y.; Mark A. Ferguson, Jamesville, N.Y.; David A. Furth, Skaneateles, N.Y.

[73] Assignee: Eveready Battery Company, Inc., St. Louis, Mo.

[21] Appl. No.: 631,444

[22] Filed: Apr. 12, 1996

[51] Int. Cl.[6] .............................. H02J 7/00; H01M 10/46

[52] U.S. Cl. ............................................ 362/183; 362/184

[58] Field of Search .................................... 362/183, 184, 362/202, 204, 205, 20; 320/2

[56] References Cited

U.S. PATENT DOCUMENTS

| | | |
|---|---|---|
| D. 88,205 | 11/1932 | Williams . |
| D. 112,635 | 12/1938 | Ferris . |
| D. 210,905 | 4/1968 | Kahn . |
| D. 213,516 | 3/1969 | Ashe . |
| D. 220,801 | 5/1971 | Rams . |
| D. 221,248 | 7/1971 | Angibaud . |
| D. 228,519 | 10/1973 | Moore . |
| D. 233,469 | 10/1974 | Moore . |
| D. 240,550 | 7/1976 | Brindley . |
| D. 241,971 | 10/1976 | Brindley . |
| D. 248,504 | 7/1978 | Rhoades et al. . |
| D. 251,632 | 4/1979 | Lievin . |
| D. 254,514 | 3/1980 | Nicholl et al. . |
| D. 255,839 | 7/1980 | Sassmannshausen . |
| D. 262,578 | 1/1982 | Nicholl et al. . |
| D. 263,630 | 3/1982 | Wong . |
| D. 266,957 | 11/1982 | Lee . |
| D. 271,807 | 12/1983 | Sassmannshausen . |
| D. 273,048 | 3/1984 | Chan . |
| D. 274,368 | 6/1984 | Skarman . |
| D. 275,423 | 9/1984 | Stansbury, Jr. et al. . |
| D. 276,375 | 11/1984 | Fenne . |
| D. 276,658 | 12/1984 | Yuen . |
| D. 280,029 | 8/1985 | Petterson . |
| D. 283,254 | 4/1986 | Fenne . |
| D. 284,707 | 7/1986 | Tanaka . |
| D. 285,356 | 8/1986 | Schosser et al. . |
| D. 288,245 | 2/1987 | Corder et al. . |
| D. 291,838 | 9/1987 | Tung . |
| D. 292,321 | 10/1987 | Liu . |
| D. 294,869 | 3/1988 | Kwan . |
| D. 296,011 | 5/1988 | Adams . |
| D. 296,012 | 5/1988 | Petterson . |
| D. 296,477 | 6/1988 | Powell et al. . |
| D. 299,173 | 12/1988 | Powell et al. . |
| D. 299,274 | 1/1989 | Ohashi . |
| D. 301,631 | 6/1989 | Leung . |
| D. 301,750 | 6/1989 | Fenne . |
| D. 308,253 | 5/1990 | Battles et al. . |
| D. 308,257 | 5/1990 | Staubitz et al. . |
| D. 312,138 | 11/1990 | Burns .1 |
| D. 313,665 | 1/1991 | Yuen . |
| D. 314,057 | 1/1991 | Naldi . |
| D. 315,608 | 3/1991 | Petterson et al. . |

(List continued on next page.)

FOREIGN PATENT DOCUMENTS

| | | |
|---|---|---|
| 960624 | 1/1975 | Canada . |
| 994737 | 8/1976 | Canada . |
| 994738 | 8/1976 | Canada . |
| 2195775 | 3/1974 | France . |
| 2353572 | 5/1975 | Germany . |
| 510300A2 | 10/1992 | Germany . |

*Primary Examiner*—Thomas M. Sember

*Attorney, Agent, or Firm*—Robert W. Welsh; S. Allan Fraser

[57] ABSTRACT

A rechargeable flashlight having a nightlight is provided comprising in combination a housing, a rechargeable power supply within the housing, first and second lamp assemblies disposed within said housing, a rotating electrical connector attached to the housing to selectively interconnect the rechargeable power supply to an AC power source to recharge the battery. The rotating connector also connecting the second lamp assembly to the rechargeable power supply. In a second position, the rotating electrical connector is disconnected from the rechargeable power supply and interrupts the power to the second lamp assembly.

25 Claims, 6 Drawing Sheets

U.S. PATENT DOCUMENTS

| | | | |
|---|---|---|---|
| D. 315,609 | 3/1991 | Garrity . | |
| D. 320,463 | 10/1991 | Pettersen et al. . | |
| D. 321,785 | 11/1991 | Garrity . | |
| D. 323,404 | 1/1992 | Fenne . | |
| D. 324,110 | 2/1992 | Yuen . | |
| D. 324,580 | 3/1992 | Young . | |
| D. 325,100 | 3/1992 | Usami . | |
| D. 326,923 | 6/1992 | Yuen . | |
| D. 328,145 | 7/1992 | Yuen . | |
| D. 331,118 | 11/1992 | Yeung . | |
| D. 332,321 | 1/1993 | Yuen . | |
| D. 336,965 | 6/1993 | Yau . | |
| D. 343,015 | 1/1994 | Yuen . | |
| D. 343,018 | 1/1994 | Garrity . | |
| D. 343,019 | 1/1994 | Garrity . | |
| D. 343,468 | 1/1994 | Yuen . | |
| D. 343,469 | 1/1994 | Yuen . | |
| D. 344,811 | 3/1994 | Garrity . | |
| D. 348,942 | 7/1994 | Yuen . | |
| D. 350,407 | 9/1994 | Yuen . | |
| D. 352,564 | 11/1994 | Marischen . | |
| D. 357,757 | 4/1995 | Bamber et al. . | |
| D. 363,138 | 10/1995 | Poon . | |
| D. 364,476 | 11/1995 | Pettersen . | |
| D. 366,127 | 1/1996 | Yuen . | |
| 2,581,129 | 1/1952 | Muldoon | 362/184 |
| 3,144,993 | 8/1964 | Sassmannshausen . | |
| 3,192,378 | 6/1965 | Oldenburger . | |
| 3,222,513 | 12/1965 | Feo . | |
| 3,226,538 | 12/1965 | Bustamante . | |
| 3,233,091 | 2/1966 | Hunt . | |
| 3,458,794 | 7/1969 | Bohnstedt et al. . | |
| 3,711,703 | 1/1973 | Bacevius . | |
| 3,794,824 | 2/1974 | Bacevius . | |
| 3,976,986 | 8/1976 | Zabroski . | |
| 3,982,120 | 9/1976 | Wynn . | |
| 4,177,500 | 12/1979 | Nicholl et al. . | |
| 4,228,484 | 10/1980 | Johnstone . | |
| 4,288,484 | 9/1981 | Johnstone | 362/184 |
| 4,325,107 | 4/1982 | MacLeod | 362/183 |
| 4,412,168 | 10/1983 | Sell . | |
| 4,556,932 | 12/1985 | Lehrer et al. . | |
| 4,571,531 | 2/1986 | Lin | 362/183 |
| 4,605,993 | 8/1986 | Zelina, Jr. | 362/184 |
| 4,647,832 | 3/1987 | Fenne et al. . | |
| 4,713,735 | 12/1987 | Hiltman | 362/183 |
| 4,743,829 | 5/1988 | Fenne et al. . | |
| 4,794,315 | 12/1988 | Pederson et al. | 362/183 |
| 4,857,702 | 8/1989 | Cafaro . | |
| 4,914,555 | 4/1990 | Gammache . | |
| 5,006,779 | 4/1991 | Feenne et al. . | |
| 5,160,879 | 11/1992 | Tortola et al. . | |
| 5,220,152 | 6/1993 | Doran . | |
| 5,401,178 | 3/1995 | Liu . | |
| 5,422,799 | 6/1995 | Morrison, Sr. | 362/184 |

RECHARGEABLE FLASHLIGHT ASSEMBLY WITH NIGHTLIGHT

BACKGROUND OF THE INVENTION

This invention relates generally to flashlights and, more particularly, to a rechargeable flashlight also providing a nightlight.

Flashlights have been developed which contain rechargeable batteries in a sealed flashlight container. When the battery becomes discharged to a point where the flashlight is no longer operable, the operator simply plugs the flashlight into an electrical outlet for a period of time until the battery is recharged. The flashlight is then disconnected from the outlet and used in a conventional manner until the battery again is discharged. A disadvantage associated with this product is that once the rechargeable battery is no longer capable of handling a charge, the flashlight is disposed of because no provision is made to replace the rechargeable battery. The flashlight is simply thrown away in the trash and disposed of in landfills and other waste disposal systems. The rechargeable batteries contained within those systems present an environmental hazard and safety issue. Another disadvantage is that even though the battery is inoperative, the entire flashlight housing is disposed of, resulting in waste and increased cost to the flashlight owner.

Flashlights, such as those described above, can also provide emergency lighting when the alternating current (AC) charging the battery system is interrupted. When the flashlight is plugged into an AC electrical socket and receiving a charge, and in almost all cases when the flashlight switch is in the ON position, the lamp is OFF. Such flashlights do not come on until the electrical power at the socket is interrupted or the flashlight is removed from the socket. In the instances where a power outage occurs, the batteries in the flashlight are only capable of providing enough power to operate the lamp for a few hours. The primary purpose of such a flashlight is to temporarily replace light normally supplied by an AC powered light source whenever the AC supply is interrupted. Once AC power is restored, the lamp is deactivated and the battery system recharged. A disadvantage with the emergency flashlights and lanterns is that once AC power is interrupted, the lamp is activated which rapidly drains the rechargeable cell. Furthermore, the function of the flashlight is limited for use either as a short-term emergency light or flashlight. If the primary switch is OFF and the AC power is interrupted, the lamp is not lit, and locating the flashlight can be difficult in the dark. To date, no one has produced a rechargeable flashlight which provides a conventional light as well as a glow panel nightlight operated by DC power.

SUMMARY OF THE INVENTION

In its broadest sense, one embodiment of the invention provides a rechargeable flashlight having a first lamp for providing a conventional flashlight beam, and a second lamp for providing a nightlight function.

In another form of the invention, a flashlight is provided which comprises in combination a flashlight casing defining an interior chamber configured to receive a power supply and lamp assembly detachably fixed therein. The power supply includes a replaceable, rechargeable battery mounted thereon. An electrical connector is also provided, and configured to move between a first and second position to selectively recharge the battery therein. Operatively coupled to the electrical connector is a second lamp assembly to be powered by the rechargeable battery. With the electrical connector in a retracted position, the second lamp assembly is disconnected from the rechargeable battery.

In yet another form of the invention, a rechargeable flashlight is provided comprising in combination a housing open at one end and closed at an opposite end. First and second lamp assemblies and a power supply circuit are slidably received within the housing. An electrical connector is provided at one end of the housing to selectively interconnect the power supply circuit to an external electrical power source, such as an AC socket, for recharging the battery. The electrical connector also connects the second lamp assembly to the DC power provided by the rechargeable batteries. In a second position, the electrical connector is disconnected from the power supply circuit as well as the second lamp assembly, and power is provided to the first lamp assembly by the rechargeable battery. The housing is closed by a removable lens assembly, concentrically receiving an incandescent lamp extending from the first lamp assembly for organizing the light produced by the lamp into a beam. A port or opening provided in the side of the housing is closed by a translucent lens configured to receive the second lamp assembly. The first and second lamp assemblies and the power supply circuit may be formed as an integral unit and detachably fixed within the flashlight casing or housing so that the operator may remove the lamp assemblies and power supply circuit as a unit. Any electrical connection between the external power supply and the flashlight's circuit is interrupted when the lamp assemblies and power supply circuit are removed from the flashlight casing.

DETAILED DESCRIPTION OF THE DRAWING FIGURES

A better understanding of the invention and the advantages provided thereby may be obtained by reference to the specification and the attached drawing figures, wherein.

Figures 7, 12, 13:
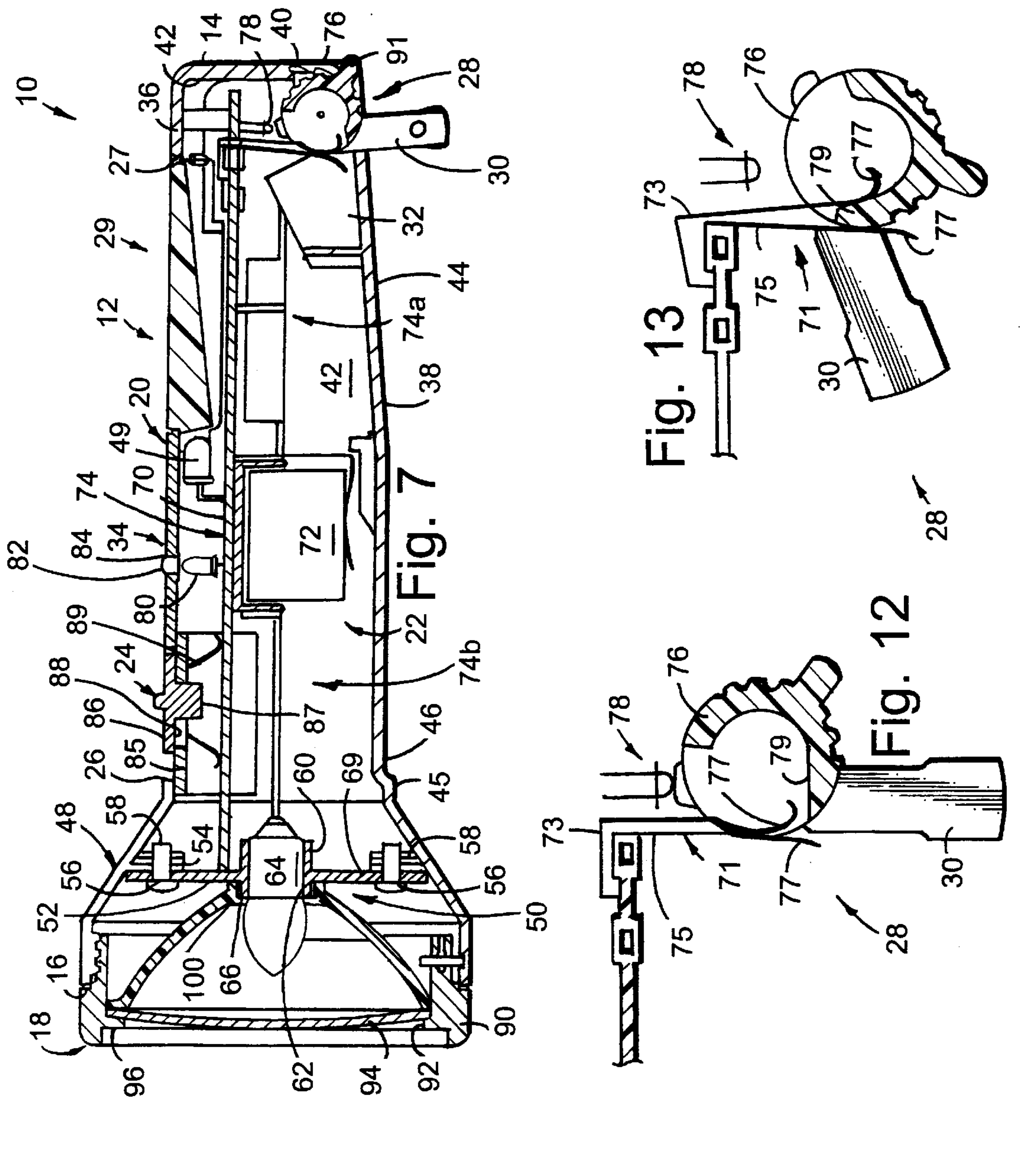
FIG. 7 is an elevational section view taken along line VII—VII shown in FIG. 2.
Figure 8:
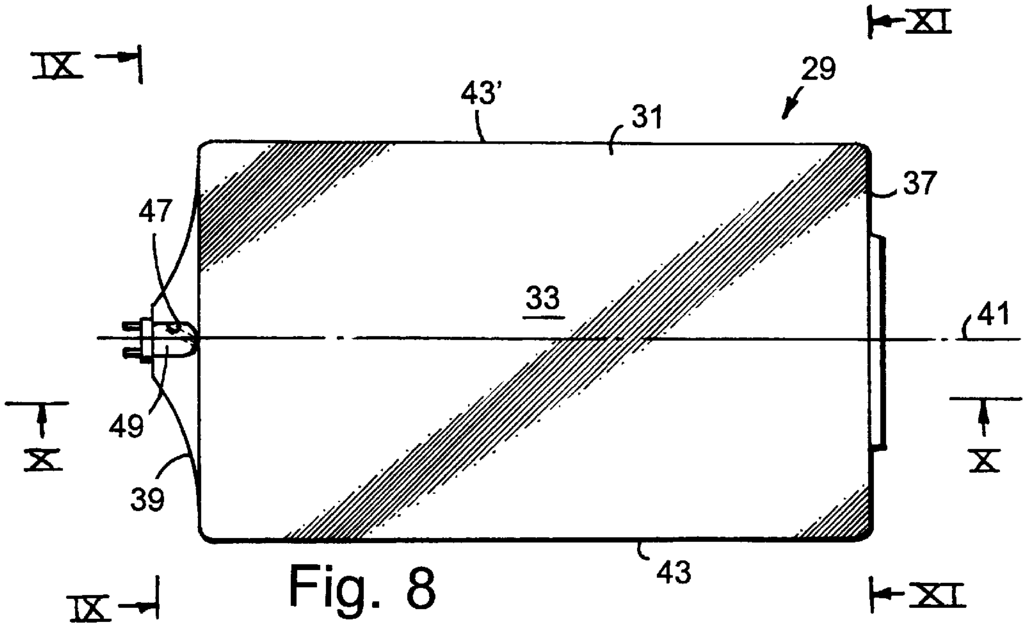
FIG. 8 is a plan view of one embodiment of a nightlight lens.
Figure 9:
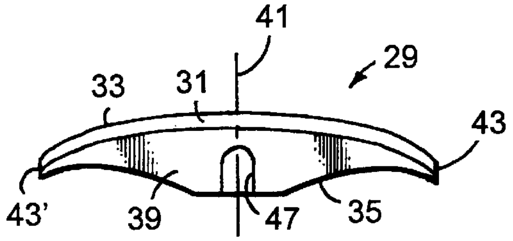
Figure 11:
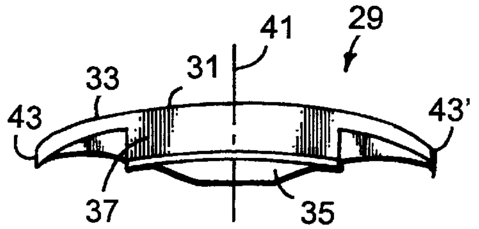
Figure 10:
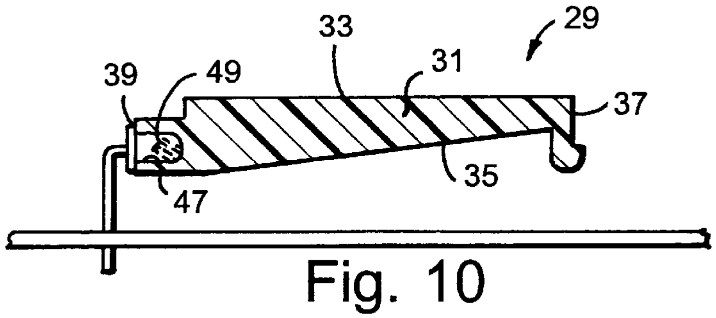
Figure 14:
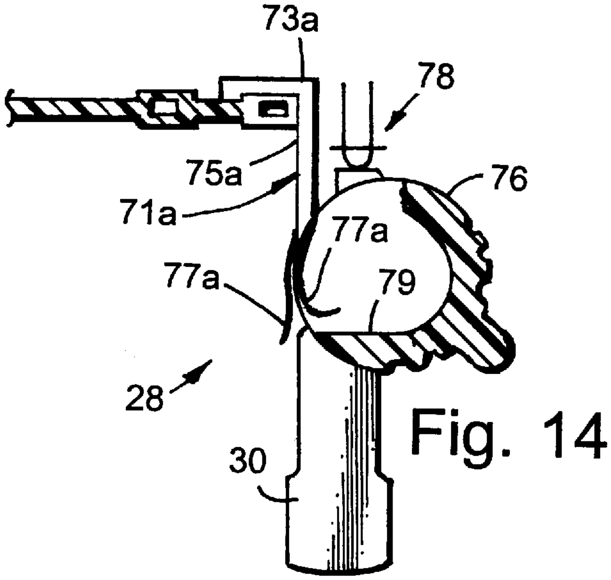
Figure 15:
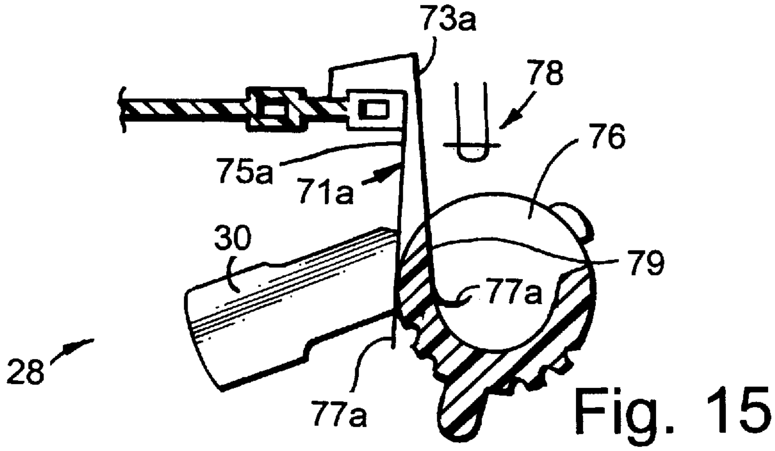
Figure 16:
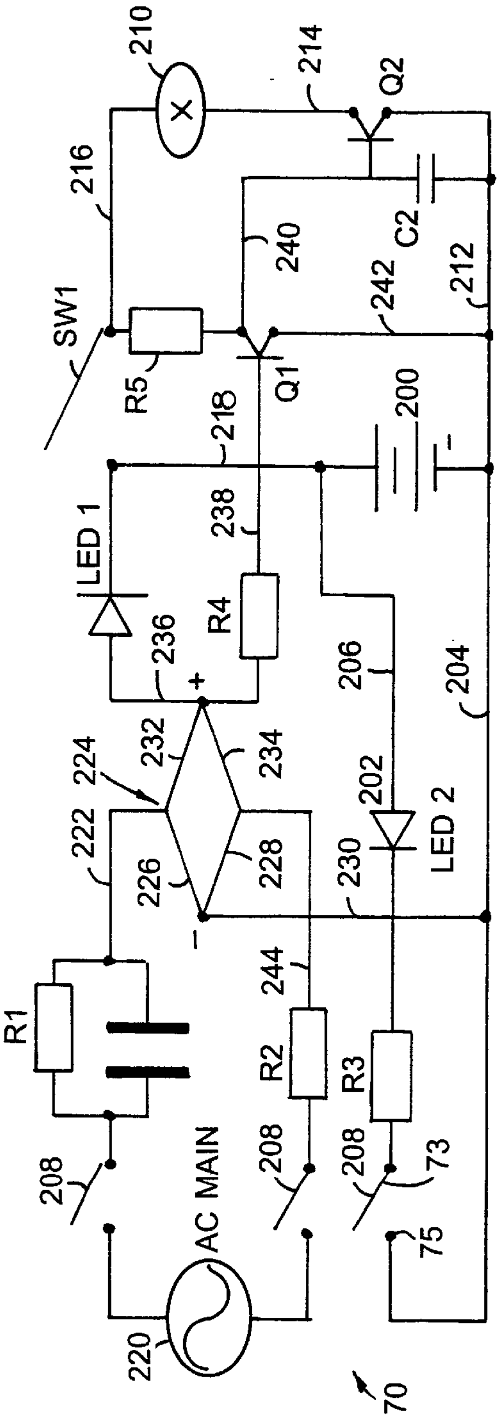
Figure 17:
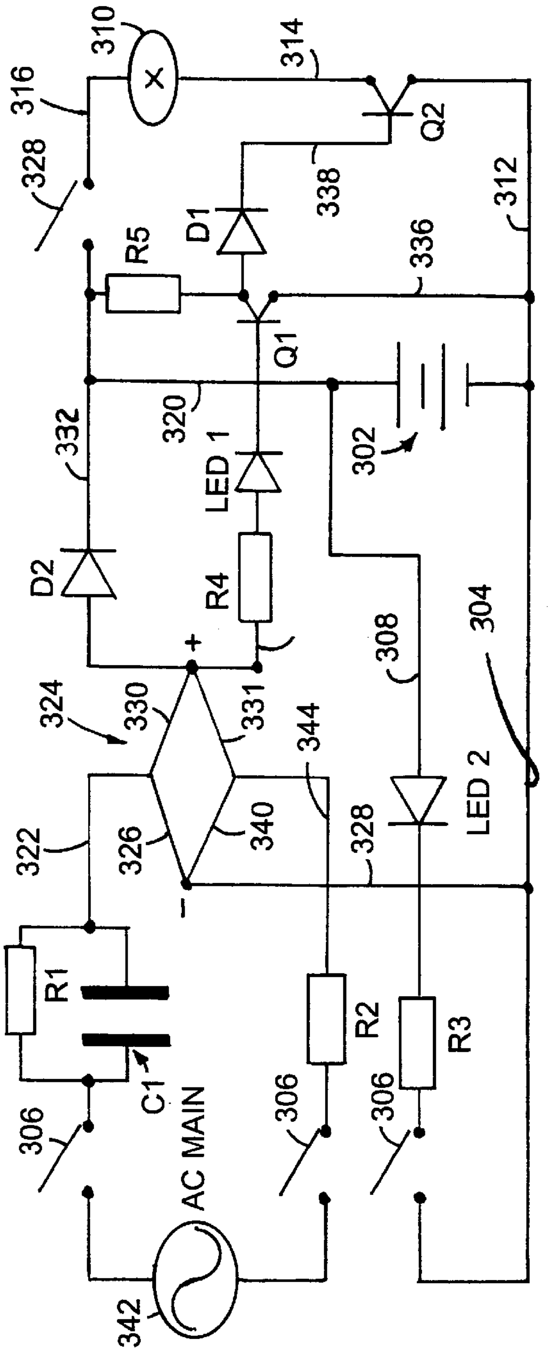

FIGS. 9–11 of the nightlight lens provide elevational views taken along lines IX—IX, X—X, and XI—XI, respectively, shown in FIG. 8;

FIGS. 12 and 13 generally illustrate first and second positions of a rotating electrical connector contemplated to be used in association with the invention;

FIGS. 14 and 15 generally illustrate first and second positions of an alternate embodiment of a rotating electrical connector contemplated to be used in assocaition with the invention;

FIG. 16 is a general electrical schematic diagram of one embodiment of the invention; and FIG. 17 is a general electrical schematic diagram of another embodiment of the invention.

DETAILED DESCRIPTION OF THE PREFERRED EMBODIMENTS

For the purposes of the following description, the terms "upper," "lower," "right," "left," "front," "rear," "vertical,"

Figure 1:
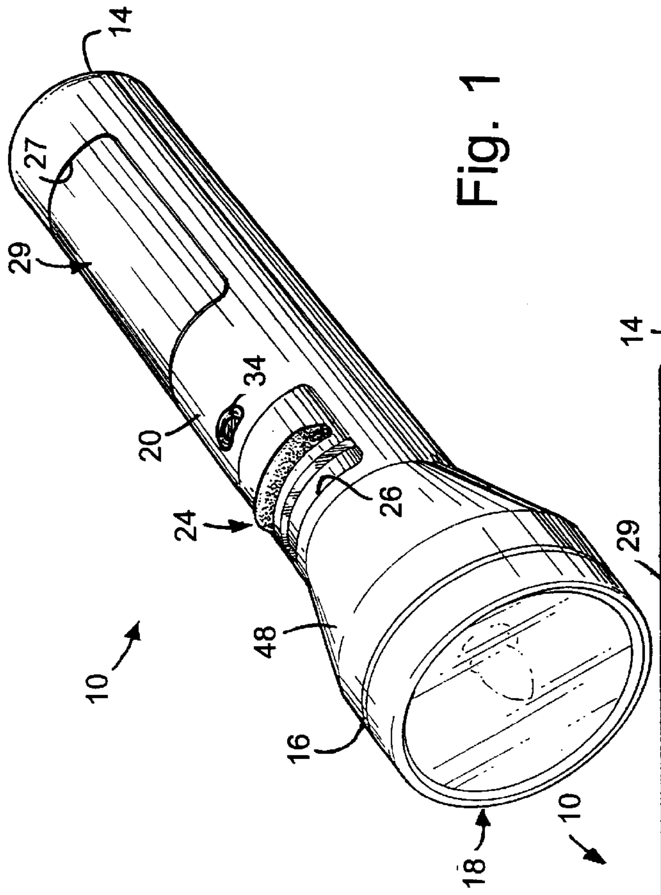
FIG. 1 is a perspective view of one embodiment of a flashlight illustrating the instant invention.
Figure 2:
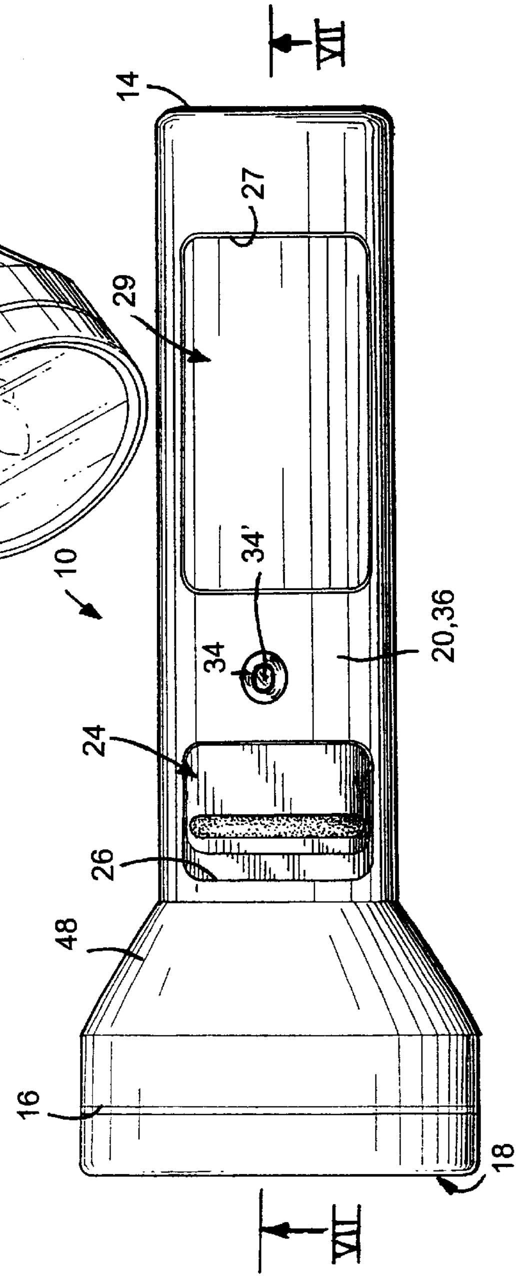
FIGS. 2–4 are a plan view, side view, and bottom view, respectively, of the sides of the invention.
Figure 5:
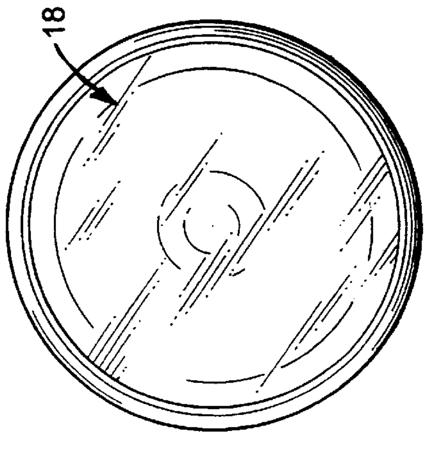
FIGS. 5 and 6 are opposing end views of the invention.
Figure 6:
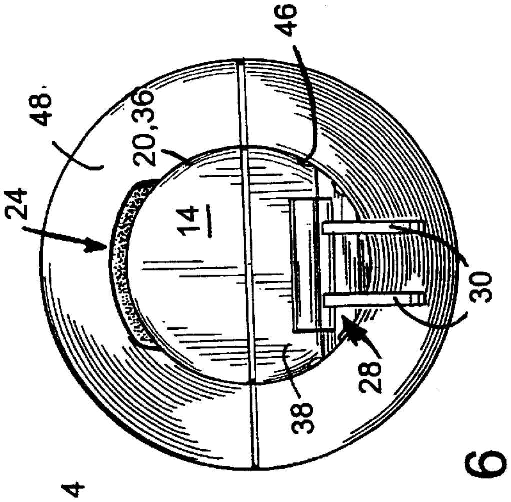
Figure 3:
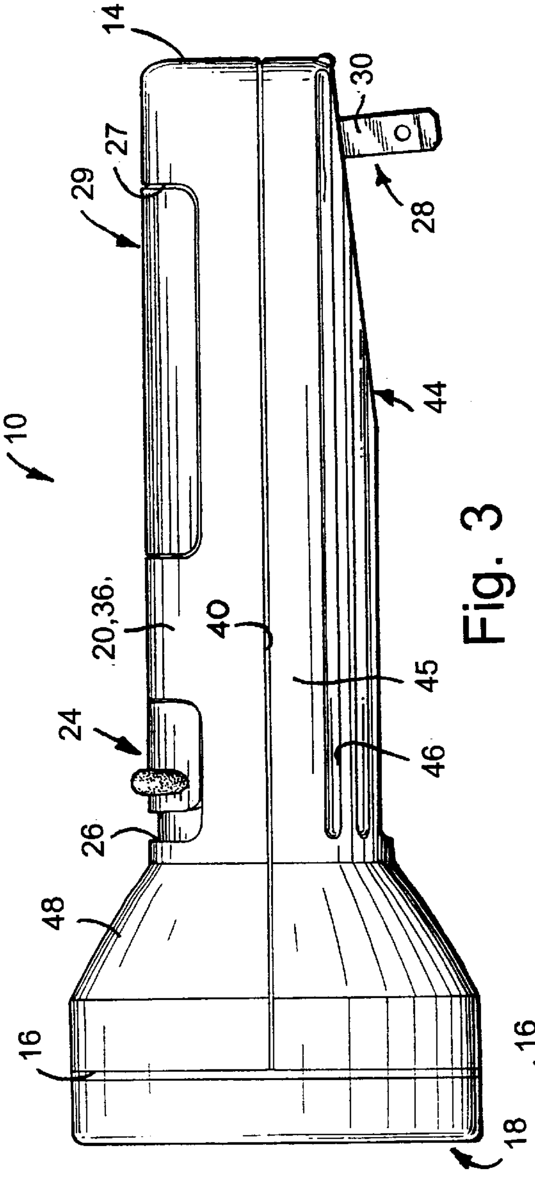
Figure 4:
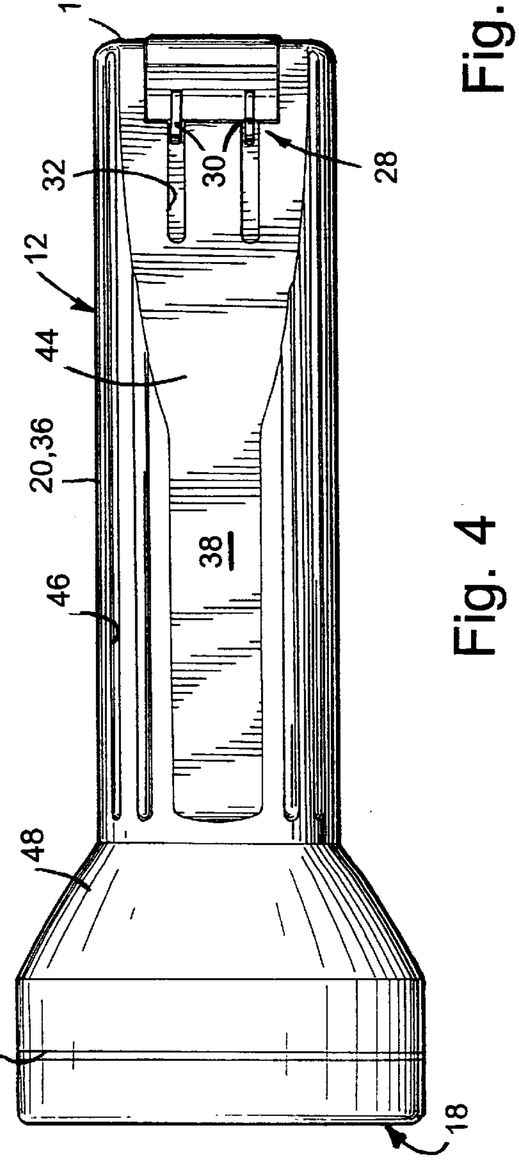

"horizontal," and derivatives or equivalents thereof shall relate to the invention as oriented in FIG. 3. It is understood that the invention may assume various alternative orientations, except where expressly specified to the contrary. It is also understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered limiting unless the claims expressly state otherwise. Furthermore, any reference herein to the term "flashlight" is intended to encompass hand-held, battery-powered lanterns and are considered herein to be equivalent in function, if not structure. Moreover, the term "nightlight" as used herein refers to a diffused light source, often colored, for providing low intensity light during times when the ambient light conditions are low or dark. For example, the nightlight may produce less than fifty percent and more than five percent of the light produced by the primary or principle light source. Such nightlights may be achieved using LCDs, LEDs, or electroluminescent panels. The primary lights may include incandescent, fluorescent, halogen, or other lamps capable of producing sufficient light as described in greater detail below.

Referring to FIGS. 1–7, one flashlight design 10 embodying the instant invention includes a flashlight casing or housing 12 closed at a first end 14 and receiving a first lens assembly 18 and a circuit assembly 70 at an opposite end 16. The flashlight casing may include a generally elongate body 20 defining an interior chamber 22. The diameter of body 20 may be substantially constant along most of its length, and can include an outwardly tapering, frusto-conical portion 48, proximate end 16 to accept and accommodate the lens assembly 18. Although flashlight casing 12 is shown as having a generally tubular body 20, other configurations are anticipated, including rectangular, oval, square, or free form, so long as the basic components described herein can be accommodated. The component may also be arranged to suit the particular flashlight design. For the purposes of example only, the following discussion will refer to the embodiment shown in FIGS. 1–7.

Contained by body 20, and extending into interior chamber 22, is a switch assembly 24 slidably disposed within an opening 26. Switch assembly 24, described in greater detail below, is configured to translate between first and second positions within opening 26 and engage circuit assembly 70 to turn the flashlight 10 ON and OFF. A second opening 27 is provided in casing or housing 12, preferably between end 14 and lens assembly 18, receiving a second lens assembly 29, described in greater detail below. Also formed in housing 12 is a port 34 to receive an indicator described below for signaling when the flashlight is coupled to an AC power supply or socket to recharge the battery.

Mounted within housing or casing 12, proximate the first or closed end 14, and interacting with circuit assembly 70 is an electrical connector 28, preferably a two-prong male connector conventionally used to complete an electrical connection with a female socket. Electrical connector 28 is configured to rotate between a first position extending from casing 12, to a second, retracted position where the prongs 30 are received within recesses 32 of tubular body 20. Electrical connector 28 may be polarized in a well-known manner by providing different sized prongs.

Housing 12 may be made from a variety of materials including machined steel, aluminum, or brass, but is preferably made from a polymeric material, such as high-impact acrylonitrile butadiene styrene (ABS) plastic or the like. More preferably, casing or housing 12 is molded into upper and lower halves 36, 38, respectively, which may be interconnected and ultrasonically welded along joint line 40 to form tubular body 20. Using components molded from polymeric material, halves 36 and 38 may be formed such that the walls 42 of each half close first end 14. Additionally, a portion 44 of the exterior surface 45 of lower half 38 of housing 12 may have a flat spot formed thereon at an angle to permit the flashlight 10 to rest against an AC outlet. However, if the desired housing configuration included a generally planar surface, such a tapered surface or flat spot 44 may be unnecessary. Exterior surface 45 of casing 12 may also include texturing, such as stippling, channels, or other types of structures to improve the feel and grip of the flashlight by the user. For example, as shown in FIGS. 3, 4, 6, and 7, exterior 45 of lower housing 38 includes generally parallel channels 46 extending substantially the length of tubular body 20, terminating at one end proximate the base of the frusto-conical portion 48 and at plug 28 at the intersection with flat spot 44.

Disposed within the interior of frusto-conical portion 48 is a first lamp assembly 50 intended to provide a primary directional light (FIG. 7). Lamp assembly 50 generally includes a mounting plate 52 preferably formed from ABS plastic and having a diameter substantially equal to the inside diameter of frusto-conical portion 48. One side of plate 52 butts against bosses 54 extending from the interior wall of frusto-conical portion 48. Bosses 54 may have holes to receive each fastener, but preferably retain a metal fastener such as a square nut. Screws 56 preferably extend through mounting plate 52 and into nuts 58 retained by bosses 54. Mounting plate 52 also includes a tubular barrel 60 extending therethrough and having an interior wall 62 of sufficient diameter to receive a conventional flashlight bulb 64. Light bulb or lamp 64 is located within barrel 60 by a flange extending from the light bulb base and engaging one end of the barrel, such as indicated at 66. The opposite end of barrel 60 has a portion of the wall removed to produce a gap (not shown) in the barrel. The gap permits one of the electrical contacts to engage the side of lamp 64. The tip of the lamp engages a second electrical contact in order to complete the electrical circuit with the lamp. These details will be more apparent below.

The second lens assembly 29 disposed within opening 27 provides a nightlight function and, as shown in FIGS. 8–11 may be defined by a generally wedge-shaped lens or glow panel 31, preferably made from a colored polymeric material, such as polycarbonate, crystal polystyrene, acrylic, polypropylene, polyethylene, or other polymeric material. In a preferred embodiment, lens assembly 29 is made from a colored, polycarbonate and may occupy a substantially larger or smaller area than is shown by opening 27. In instances where the flashlight has a generally cylindrical barrel for a housing, an outer surface 33 of lens 31 is curved to conform substantially to the exterior shape of the flashlight. An interior surface 35 is preferably tapered from a first end 37 to an opposite end 39, and may also taper from a center line 41 to opposite sides 43 and 43'. End 39 of lens 31 also includes an opening or depression 47 configured to receive a light-emitting diode or similar light source 49, such that light rays produced by source 49 propagate through lens 31 and are substantially all refracted out through outer surface 33. To achieve this, the angle of tapered inner surface 35 is substantially below the optical critical angle such that light rays from source 49 are reflected toward outer surface 33, where they are refracted outwardly to the exterior of the lens to produce a secondary, generally non-collimated light. In this manner, most of the light produced by source 49 is directed to the exterior of lens 31.

Referring again to FIG. 7, circuit 70 has one end connected to the back 69 of mounting plate 52 and extends substantially the length of casing 20 with the opposite end terminating proximate closed end 14. Circuit 70 contains a disposable, rechargeable battery 72, which may be removably mounted between battery contacts (not shown). Battery 72 is preferably a rechargeable, nickel cadmium battery having a voltage output compatible with light bulbs or lamps 49, 64. Circuit 70 also includes a recharging circuit 74*a* selectively connected to electrical connector 28 disposed at end 14 of flashlight housing 12 (FIGS. 7, 12, and 13). Electrical connector 28 includes prongs 30 which are mounted to a rotating drum or barrel 76 journaled within lower half 38 of casing 20. When barrel 76 is rotated to a first position, contacts 78 of recharging circuit 74*a* engage the ends of prongs 30, and when rotated to a second position, prongs 30 are moved to a stowed position within recesses 32, and contacts 78 are disconnected from the ends of prongs 30 to interrupt recharging circuit 74*a*. Additionally, barrel 76 selectively connects and disconnects lamp 49 to battery 72. Adjacent barrel 76 is a contact assembly 71 having first and second spring contacts 73 and 75, respectively. In the preferred embodiment (FIGS. 12 and 13), contact 73 has one end secured to the removable circuit board 74 and extends generally in an arc toward barrel 76 such that the opposite end lies against contact 75, also extending away from board 74. With barrel 76 in the extended or open position, contacts 73, 75 make contact and connect lamp 49 in nightlight assembly 29 to the DC power of battery 72. When barrel 76 is rotated to the retracted position, a wall 79 of barrel 76 urges contact 73 away from 75, thus interrupting the circuit between the light source 49 and the battery 72. Alternatively, contacts 73*a* and 75*a* (FIGS. 14 and 15) may both extend away from board 74 in a generally parallel fashion and arranged such that the free ends or tips of the two contacts arc away from each other. When barrel 76 is in the extended or open position, contacts 73*a*, 75*a* contact each other and connect lamp 49 in nightlight assembly 29 to the DC power of battery 72. With barrel 76 in the retracted or closed position, wall 79 of barrel 76 intervenes between the contacts 73*a* and 75*a* and thus interrupts the circuit. The latter switch arrangement may be used in instances where board 70 is not removable from body 20.

Recharging circuit 74*a* and power supply circuit 74*b* provide current to lamps 49 and 64 and may be in any one of a number of configurations as described below, so long as circuit 74*a* recharges battery 72 and provides electrical power to lamps 49 and 64 from battery 72 when disconnected from the AC source. It is preferred that a second light-emitting diode 80 (LED) be operably coupled to recharging circuit 74*a* and extend proximate a lens 82 spanning port 34 formed in tubular housing 20. It is preferred that lamp or diode 80 illuminate when an AC voltage is applied to the recharging circuit 74*a* through the electrical connector 28 to indicate that the battery 72 is being recharged and that there is a voltage existent inside the flashlight casing.

Selectively connecting battery 72 to lamp 64, is switch assembly 24 (FIG. 7). The switch assembly 24 includes a switch plate 85 fixed to the interior wall 42 of half 36 and overlying and closing the opening 26 provided for the switch assembly. Switch slide 86 is provided which is generally rectangular in plan view and curved in elevation view to substantially conform to the general, cylindrical shape of the flashlight housing or tubular body 20. A projection 87 extends from the concave side 88 of slide 86 which extends through a slot in the switch plate 85. A contact strip 89 preferably made from phosphate bronze or other conductive material is press-fit over the detent or post 87 extending from slide 86. Flanges (not shown) extending from contact strip 89 retain the strip on post 87. Contact strip 89 includes a pair of legs which slidably engage electrical contacts formed on the circuit 70 to close the circuit to the lamp 64 when the flashlight is switched ON.

Closing second end 16 of flashlight casing 12 is the primary lens assembly 18, briefly mentioned above. Lens assembly 18 includes a lens ring 90 molded from ABS plastic and having one end threadably engaging open end 16 of the flashlight. Disposed within the lens ring 90 and spanning an opening 92 formed by flange or ring 96 is a polymeric or glass lens 94. Lens 94 may be configured to disperse or refract light produced by the lamp 64 in a predetermined pattern including a fresnel-type structure to collimate the beam produced by lamp 64. Adjacent lens 94, and urging lens 94 against flange 96, is one edge of a reflector 98, such as commonly used in flashlight designs. The reflector includes a central opening 100 concentric with lens 94 and configured to receive a portion of lamp 64 so as to locate the light-emitting element of the lamp generally at a focal point of the reflector so that light produced by the lamp is reflected to form a beam of light emitting from the end of the flashlight.

Referring to FIG. 16, one embodiment of circuit 70 includes a battery 200 connected to the nightlight lamp 202 (49 above) through lines 204, 206 and resistor R3, when switch 208, equivalent to barrel 76, is extended, closing contacts 73, 75. Similarly, battery 200 provides power to lamp 210 (equivalent to lamp 64 above) through lines 212, 214, 216, and 218, and transistor Q2 when switch 208 is in the open position and switch SW1 (24 above) is closed.

The recharging circuit 74*a* and circuit 74*b* for powering the nightlight source LED2 when barrel 76 is extended and prongs 30 are connected to the AC power source 220, includes an AC capacitor C1 connected in parallel to a resistor R1 such as a 47 ohm, 0.25 watt resistor. Capacitor C1 and resistor R1 are then connected by line 222 to an AC bridge 224 preferably having a 400 volt maximum capacity. Legs 226 and 228 of bridge 224 are preferably connected by line 230 which, in turn, is operably connected to battery 200 via line 204. Line 230 is also operably connected to resistor R3 and LED 202 on line 206 through contacts 73, 75. Legs 232 and 234 of bridge 224 are, in turn, operably connected in parallel to charging indicator lamp LED1 and resistor R4 through line 236. The opposite end of LED1 is, in turn, connected to the positive pole of battery 200 through line 218. The opposite end of resistor R4 is connected via line 238 to the base of transistor Q1. The collector of Q1 is operably connected to a resistor R5 which is interconnected to line 216 and to the base of transistor Q2, briefly mentioned above, via line 240. The emitter of transistor Q1 is connected to line 212 via line 242. Line 240 is also connected to line 212 across capacitor C2, preferably one having a capacitance of about 47 $\mu$F at 50V DC. Referring again to bridge 224, legs 228 and 234 are connected via line 244 and resistor R2 to the opposite pole or plug of the AC source 220. In this configuration, the nightlight LED2 is ON any time switch 208 and contacts 73, 75 are closed. If attached to a source of AC power, battery 200 is charged while the nightlight LED2 is ON.

FIG. 17 illustrates another embodiment 300 of circuit 70, described above, configured for use with a three-cell battery

302. In this configuration, nightlight LED2 is selectively connected to battery 302 via line 304, switch 306, and resistor R3 on line 308. Incandescent lamp 310 is also connected to battery 302 via line 312, the emitter and collector of transistor Q2, lines 314, 316, switch 318, and line 320. Interconnected to both nightlight 80 as well as incandescent lamp 64, is charging circuit 74*a*. Charging circuit 74*a* includes a capacitor C1 connected in parallel with resistor R1 to line 322 and one prong of barrel switch 306. Line 322, in turn, is operatively coupled to an AC bridge 324, wherein leg 326 is connected to the negative pole of battery 302 via lines 328, 304. Leg 330 of bridge 324 is connected in parallel to diode D2 on line 332, and resistor R4 and light-emitting diode LED1 on line 334. Line 332 is operatively coupled to line 320 and selectively coupled to line 316 through switch 318. Resistor R4 and LED1 are attached to the base of transistor Q1, while the collector of transistor Q1 is coupled through a resistor R5 to line 332 and switch 318. The emitter of transistor Q1 is connected in a similar fashion to ground of battery 302 through lines 336 and 312. A diode D1 on line 338 is provided for interconnecting the base of transistor Q2 to the collector of transistor Q1. Referring back to bridge 324, leg 340 is operatively connected to line 304 via line 328 as well as to the opposite terminal of the AC source 342 through line 344 and resistor R2. The opposite leg 331 interconnects leg 340 and line 344 to line 334, diode D2, and resistor R4.

The embodiments shown in FIGS. 16 and 17 function substantially the same way, but the following discussion will be limited to the embodiment shown in FIG. 17. When switch 306 is closed and AC current is passed over lines 322 and 344 to bridge 324, a load is placed on transistor Q1 which acts to close transistor switch Q2, disconnecting battery 302 from the lamp 310. When AC power is interrupted, the load at transistor switch Q1 is low, thus producing a high load at transistor switch Q2, enabling current from the battery 302 to the lamp 310. With the flashlight or lantern connected to the AC source, battery 302 is being recharged. Battery 302 is also powering nightlight LED2 on line 308 all the while switch 306 is closed. The amount of power to nightlight LED2 is small compared to recharging power provided to the battery. When AC power is interrupted, and when switch 306 remains closed, battery 302 preferably powers nightlight LED2 up to twelve hours before requiring recharging.

In assembling the rechargeable flashlight, the lower half 38 of housing 12 receives the barrel or drum 76 in a manner to allow drum 76 to rotate about an axis and permit prongs 30 to rotate from an extended position to a retracted position within the recess 32. The upper half 36 of housing 12 is preferably fitted with lens 31 in opening 27, LED lens 82, and switch assembly 24. With switch assembly 24 mounted to upper housing half 36, LED lens 82 cemented over opening 84, lens 31 fixed in opening 27, and barrel 76 journaled in lower housing 38, the two housing halves are joined along joint 40 and ultrasonically welded together to provide an integral flashlight housing closed at end 14 and open at the opposite end 16 defining the interior cavity 22.

In a separate operation, circuit 70 is provided with all of the components comprising the recharging and power supply circuits as well as light source 49. Circuit 70 is then coupled at one end to the backside 69 of the mounting plate 52 by rivet, cement, or other suitable fastener. Mounting plate 52 and circuit 70 are then slidably received in tubular housing 20 such that circuit 70 extends substantially the length of the tubular portion of body 20, and such that side 69 of mounting plate 52 butts against bosses 54 extending from the interior surface of the frusto-conical portion 48. In this configuration, source 49 is located in depression 47, LED 80 is located adjacent lens 82 in opening 84, contacts 73, 75, and 78 are located appropriately to be selectively engaged by barrel 76 and the terminal ends of prongs 30 fixed to drum 76, and the electrical contacts of the circuit 74*a* are located adjacent the contacts of the switch assembly 24. Fasteners 56 extend through plate 52 and are threaded into nuts 58 to firmly anchor the lamp assembly 50 and circuit 70 within the interior of the flashlight. Also in this configuration, lamp 64 is received within barrel 60 such that a side terminal of the lamp is engaged by one contact of the operating circuit, and the end terminal of the lamp is engaged by a second contact of the operating circuit. With the internal components of the rechargeable flashlight in place, lens ring 90, complete with lens 94 and reflector 98, is threadably received over open end 16 such that lamp 64 is received through the opening 100 in reflector 98 when lens ring 90 is tightly in place. In a preferred embodiment, the lens ring is secured to end 16 by a fastener.

In operation, the rechargeable battery is typically discharged when the product is shipped. To charge the battery, the consumer rotates drum 76 (switches 208, 306 in FIGS. 16 and 17) with the aid of flange 91 about the drum's axis to place prongs 30 in their extended position generally perpendicular to tubular body 20. In this configuration, the plugs may be mated with a female receptacle of an AC outlet to provide current to recharging circuit 74*a*. The AC voltage on recharging circuit 74*a* causes LED 80 to illuminate to signal to the operator that the flashlight is connected to an AC circuit. Lamp 49 in nightlight assembly 29 is also connected upon the rotation of drum 76, placing contacts 73 and 75 into contact with each other and completing the connection with battery 72. Lamp 49 remains on when drum 76 is extended so long as battery 72 has sufficient power, or connector 28 is connected to the AC power supply. After a period of time has lapsed to assure that rechargeable battery 72 is completely charged, flashlight assembly 10 may be removed from the AC power supply. Drum 76 is then rotated inwardly to disconnect lamp 49 and to retract plugs 30 into the recesses 32. The operator may then illuminate lamp 64 by sliding switch assembly 24 to an ON position, causing the contacts to complete the circuit. The operator may move the switch to the OFF position to open the circuit when he is finished with the lamp, thus removing the load on the battery. When the battery needs to be recharged, indicated by the low light emitted from lamp 64 or the inability to light lamp 64, the operator may then extend the prongs 30 from the housing and connect the flashlight back to the AC power supply. Once connected, lamp 49 is again lit.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A flashlight, comprising in combination:

a flashlight casing;

a battery disposed within said flashlight casing;

a first lamp assembly disposed within said flashlight casing;

a second lamp assembly disposed within said flashlight casing;

a circuit within said flashlight casing interconnecting said first lamp assembly to said battery for providing power to said first lamp assembly and recharging said battery; and an electrical connector extending through said flashlight casing and having a first position with respect to said flashlight casing for connecting said circuit to said second lamp assembly and providing an electrical current to said circuit for recharging said battery and a second position with respect to said flashlight casing for disconnecting said second lamp assembly from said circuit.

2. The flashlight as defined in claim 1, wherein said second lamp assembly includes:

a lens mounted in an opening in a wall of said flashlight casing; and a lamp for illuminating said lens.

3. The flashlight as defined in claim 2, wherein said lamp for illuminating said lens is adjacent an end of said lens.

4. The flashlight as defined in claim 2, wherein said lamp for illuminating said lens is disposed in an end of said lens.

5. The flashlight as defined in claim 1, wherein said circuit includes a charging circuit operatively interconnecting said electrical connector to said battery.

6. The flashlight as defined in claim 5, wherein said rechargeable battery is detachably coupled to said charging circuit.

7. The flashlight as defined in claim 1, wherein said electrical connector includes:

a pair of electrical contacts configured to extend from said flashlight casing to said first position to engage an electrical receptacle providing the electrical current to said circuit, and rotatable with respect to said housing to said second position generally parallel to said flashlight casing and thereby disconnecting the electrical current from said circuit.

8. The flashlight as defined in claim 1, further including a lens assembly having a reflector concentrically receiving said first lamp assembly.

9. The flashlight as defined in claim 1, wherein said circuit includes a switch extending through said flashlight casing and selectively interconnecting said circuit to said first lamp assembly.

10. The flashlight as defined in claim 1, wherein said first lamp assembly and said circuits are removable as a unit from said flashlight casing.

11. A flashlight, comprising in combination:

a housing;

a circuit disposed within said housing;

first and second lamp assemblies disposed within said housing; and a rotatable switch mounted to said housing for selectively disconnecting said second lamp assembly from said circuit, and operatively connecting said circuit to an external power supply.

12. The flashlight as defined in claim 11, wherein said circuit includes:

a rechargeable battery; and a recharging circuit operably interconnecting said rechargeable battery and said rotatable switch.

13. A flashlight comprising in combination:

a housing;

a circuit slidably disposed within said housing, said circuit including a rechargeable battery and a recharging circuit;

first and second lamp assemblies disposed within said housing, said first lamp assembly providing a flashlight function and a second lamp assembly providing a nightlight function; and a rotatable switch mounted to said housing for selectively interconnecting said second lamp assembly to said circuit, and operatively connecting said circuit to an external power supply, wherein said recharging circuit operably interconnects said rechargeable battery and said rotatable switch, and said second lamp assembly includes a lens configured to be received within and closing an opening within said housing, and a lamp disposed in an edge of said lens for illuminating said lens.

14. The flashlight as defined in claim 13, wherein said lens is configured to refract substantially all light from said lamp at said edge of said lens to an outer surface of said lens.

15. The flashlight as defined in claim 14, wherein said outer surface of said lens conforms to an outer surface of said flashlight casing.

16. A rechargeable flashlight, comprising in combination:

a circuit assembly including a rechargeable battery and a circuit for controlling a recharge of said battery;

first and second lamps, said first lamp operably coupled to said circuit assembly through a switch; and a rotatable plug operably connected to said circuit assembly for selectively connecting said rechargeable battery to an AC power supply and selectively disconnecting said second lamp from said rechargeable battery.

17. A rechargeable flashlight, comprising in combination:

a circuit assembly including a battery;

a flashlight lamp operably coupled to said battery by said circuit assembly and a first switch;

a nightlight lamp operably coupled to said battery by said circuit assembly; and a rotating plug assembly rotatable between a first position for selectively connecting said circuit assembly to an external power source and a second position, wherein said circuit assembly includes a second switch responsive to rotation of said rotating plug assembly for selectively disconnecting said nightlight lamp from said battery when said rotating plug assembly is in said second position and for connecting said nightlight lamp to said battery when said rotating plug assembly is moved from said second position.

18. The rechargeable flashlight as defined in claim 17, wherein said nightlight lamp is disposed in a side of the flashlight.

19. The rechargeable flashlight as defined in claim 17, wherein said first position of said rotating plug assembly is adapted to further connect said circuit assembly to an external power source for recharging said battery.

20. A rechargeable flashlight comprising:

a primary lamp assembly;

a nightlight lamp assembly; and an external electrical connector movable between first and second positions for selectively coupling the rechargeable flashlight to an external source of power, wherein said nightlight lamp assembly is illuminated when said external electrical connector is in said first position regardless of whether said electrical connector is connected to an external power source, and wherein said primary lamp assembly is disabled when said external electrical connector is connected to an external source of power.

21. A flashlight comprising:

a rechargeable battery;

a first lamp selectively connected to and powered by said rechargeable battery through a first switch;

an electrical connector movable between a first extended position and a second retracted position, said electrical conductor being electrically coupled to said rechargeable battery and adapted for connection to a power supply outlet when in said first extended position so as to enable said rechargeable battery to be recharged;

a second lamp selectively connected to said rechargeable through a second switch; and a charging indicator lamp connected between said electrical connector and said rechargeable battery, said charging indicator lamp being illuminated whenever said electrical connector is connected to a power supply outlet, wherein said second switch selectively connects and disconnects said second lamp to/from said rechargeable battery in response to movement of said electrical connector.

22. A flashlight comprising:

a rechargeable battery;

a first lamp selectively connected to and powered by said rechargeable battery through a first switch;

an electrical connector movable between a first extended position and a second retracted position, said electrical conductor being electrically coupled to said rechargeable battery and adapted for connection to a power supply outlet when in said first extended position so as to enable said rechargeable battery to be recharged;

a second lamp selectively connected to said rechargeable battery through a second switch; and a circuit responsive to a detection of power received through said electrical connector, for disconnecting said first lamp from said rechargeable battery when power is detected that passes through said electrical connector.

23. The flashlight as defined in claim 22, wherein said second switch selectively connects and disconnects said second lamp to/from said rechargeable battery in response to movement of said electrical connector.

24. A flashlight comprising:

a rechargeable battery;

a first lamp selectively connected to and powered by said rechargeable battery through a first switch;

an electrical connector movable between a first position and a second position, said electrical conductor being electrically coupled to said rechargeable battery and adapted for connection to a power supply outlet when in said first extended position so as to enable said rechargeable battery to be recharged; and a second lamp selectively connected to said rechargeable battery through a second switch, wherein said second switch selectively connects and disconnects said second lamp to/from said rechargeable battery in response to movement of said electrical connector.

25. A flashlight comprising:

a housing;

a battery disposed within said housing;

a switch disposed on said housing and coupled to said battery;

a first lamp disposed within said housing for projecting light from one end of said housing when power is received from said battery through said switch;

a lens configured to be received within and closing an opening within said housing; and a second lamp disposed in an edge of said lens for illuminating said lens.

* * * * *